United States Patent

Carpenter et al.

[11] Patent Number: 5,918,348
[45] Date of Patent: Jul. 6, 1999

[54] FRICTION HINGE WITH DETENT CAPABILITY

[75] Inventors: David A. Carpenter, Clarksville, Md.;
Mikhail Gelfand, Milford, Conn.;
Edward T. Rude, Columbia, Md.

[73] Assignee: TorqMaster, Inc., Stamford, Conn.

[21] Appl. No.: 09/003,377

[22] Filed: Jan. 6, 1998

Related U.S. Application Data

[60] Provisional application No. 60/042,612, Apr. 4, 1997.

[51] Int. Cl.[6] ................................................. E05D 11/08
[52] U.S. Cl. ............................................................. 16/342
[58] Field of Search ........................... 16/337, 342, 303, 16/319, 332, 336; 296/97.12

[56] References Cited

U.S. PATENT DOCUMENTS

| | | | |
|---|---|---|---|
| 2,591,246 | 4/1952 | Everest et al. | 16/337 |
| 2,772,916 | 12/1956 | Jones | 296/97.12 |
| 3,910,627 | 10/1975 | Meyer | 16/342 |
| 4,617,699 | 10/1986 | Nakamura | 16/262 |
| 5,079,799 | 1/1992 | Rude et al. | 16/342 |
| 5,231,734 | 8/1993 | Rude | 16/342 |
| 5,257,310 | 10/1993 | Takagi et al. | 16/342 |
| 5,364,149 | 11/1994 | Aymerich et al. | 16/342 |
| 5,406,678 | 4/1995 | Rude et al. | 16/342 |
| 5,500,982 | 3/1996 | Hosoi | 16/342 |
| 5,628,089 | 5/1997 | Wilcox et al. | 16/303 |
| 5,715,575 | 2/1998 | Kubota | 16/342 |

FOREIGN PATENT DOCUMENTS

| | | | |
|---|---|---|---|
| 4234760 | 4/1994 | Germany | 296/97.12 |
| 1559080 | 4/1990 | U.S.S.R. | 16/342 |

*Primary Examiner*—Chuck Y. Mah
*Assistant Examiner*—Donald M. Gurley
*Attorney, Agent, or Firm*—Gottlieb, Rackman & Reisman, P.C.

[57] ABSTRACT

The present invention provides a small, cylindrical hinge, or pivoting pin, which can be configured to produce various profiles of torque versus angle. The desired profile of torque versus angle is achieved by the shapes of the hinge shaft and the spring plates of the hinge. Detents at one or more angular positions can be achieved, with or without frictional damping torque at other angles. The friction of our hinge is produced symmetrically about the hinge axis, eliminating the problems associated with asymmetric construction.

17 Claims, 6 Drawing Sheets

5,918,348

FRICTION HINGE WITH DETENT CAPABILITY

This application claims benefit of Provisional Application Ser. No. 60/042,612, filed Apr. 04, 1997.

BACKGROUND OF THE INVENTION

Many electronic devices require hinge mounted covers. These hinges usually require friction or detents to control the positioning of the cover. In some instances, both friction and one or two detents are considered desirable. Smaller hinges are required as electronic devices have, themselves, become smaller. Most friction hinges of the prior art produce constant friction as function of angle. A few friction hinges have been disclosed which permit the torque to vary with angle, although these have usually been too large in size for small modern electronic equipment. A further troublesome characteristic of prior art hinges is that the friction and/or detenting forces are produced by components within the hinge that are not symmetrically disposed about the hinge axis. The result of this asymmetry is that forces are produced in the bearings during rotation of the hinge. These forces are undesirable because they are an extra source of friction that is hard to control. Also, this bearing friction results in bearing deterioration, wear, and lost motion.

The present invention provides a small, cylindrical hinge, or pivoting pin, which can be configured to produce various profiles of torque versus angle. The desired profile of torque versus angle is achieved by the shapes of the hinge shaft and the spring plates of the hinge. Detents at one or more angular positions can be achieved, with or without frictional damping torque at other angles. The friction of our hinge is produced symmetrically about the hinge axis, eliminating the problems associated with asymmetric construction.

BRIEF DESCRIPTION OF THE INVENTION

The preferred embodiment of our inventive hinge has a generally cylindrical exterior shape to facilitate easy mounting into a wide variety of different host devices, the devices in which the hinges are used. The housing is split into two axially abutting cylindrical segments which are held together but are rotatable with respect to one another. To prevent rotation of each of the exterior casings of the hinge in its respective part of the host device, it is desirable that the exterior surfaces of the hinge casing segments have a feature, such as an axial groove or protruding flange to engage a matching feature in the host device. Our preferred embodiment has a groove in its exterior surface so as to occupy the smallest possible space within the host device.

A shaft is pressed into one segment of the hinge casing, to rotate therewith, and extends into other segment of the casing which contains spring plates that are symmetrically placed about the shaft. The spring plates contact the shaft as it rotates, causing the requisite frictional and/or detenting forces which are determined by the shapes of the shaft and the plates.

Since the hinge is usually required to be rather small in diameter, large surface stresses are encountered between the shaft and the surfaces of the spring plates in order to produce the required torque. Another embodiment has a wear plate as the first spring plate on each side of the shaft.

Accordingly, it is an object of our invention to provide a rotatable frictional and/or detenting device which is small in size.

It is a further object of our invention to provide a hinge requiring a very simple but firm interface with host devices.

It is a still further object of our invention to provide a rotary friction and/or detenting hinge whose torque/detenting characteristics can be tailored to specific requirements of the host device in which the hinge is to be used.

It is an additional object of our invention to provide a pivoting hinge that is axially symmetric in construction, so that substantially no net internally generated radial forces are present in the rotary bearings of the hinge.

It is a further object of our invention to provide a rotary friction hinge with long life over which the operating characteristics remain substantially constant.

Finally, it is also an objective of our invention to provide a rotary friction hinge which is simple in construction, consists of few parts, and is easy to assembly.

Other objects and advantages of our invention will become apparent from the descriptions that follow.

BRIEF DESCRIPTION OF THE DRAWINGS

Further understanding of our invention will become apparent upon consideration of the following detailed description in conjunction with the drawings, in which.

DETAILED DESCRIPTION OF THE DRAWINGS

Figure 1:
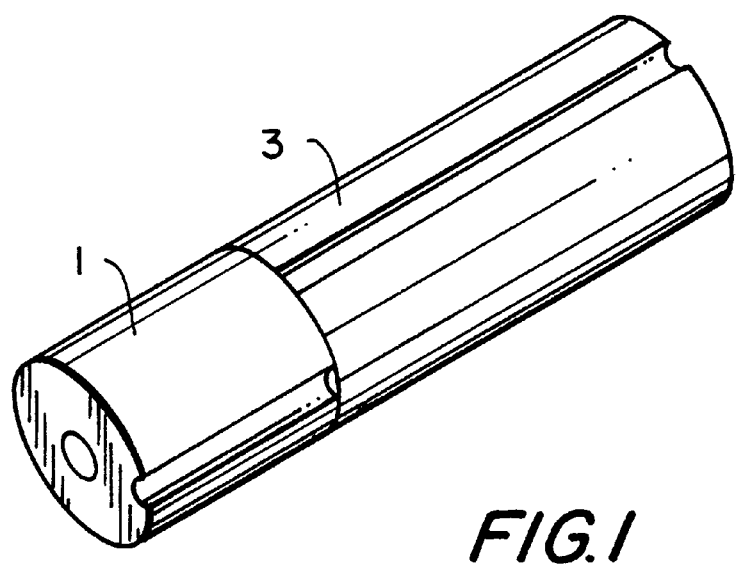
FIG. 1 is a projection view of the assembled hinge, shown with the base partially rotated with respect to the housing.
Figure 2:
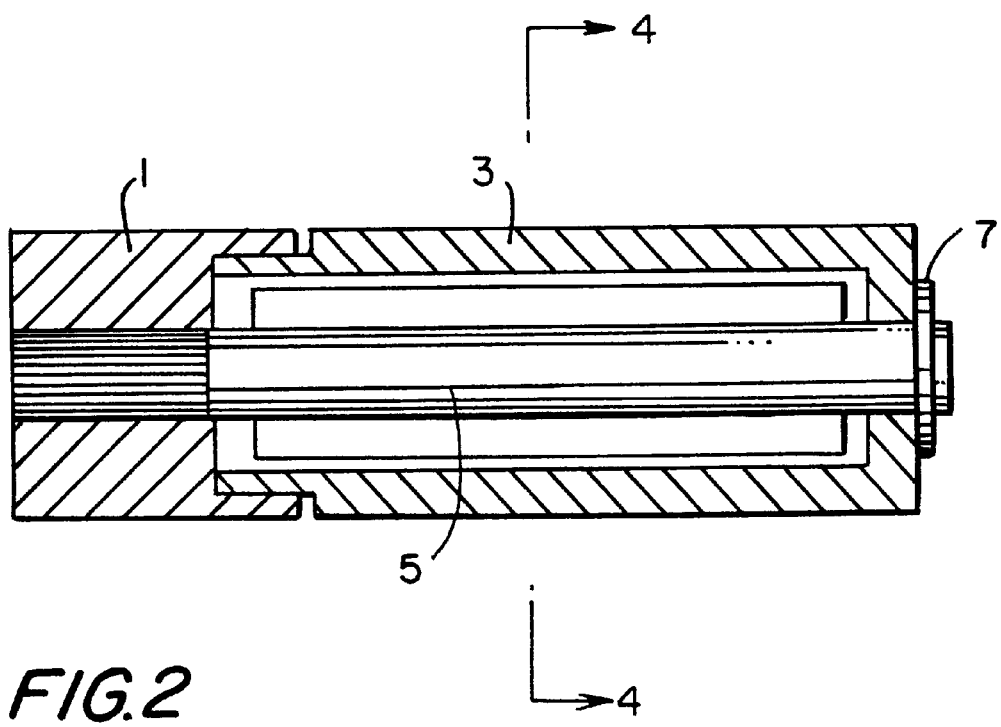
FIG. 2 is a cross-sectional view of the assembled hinge showing the base, housing and shaft.
Figure 3:
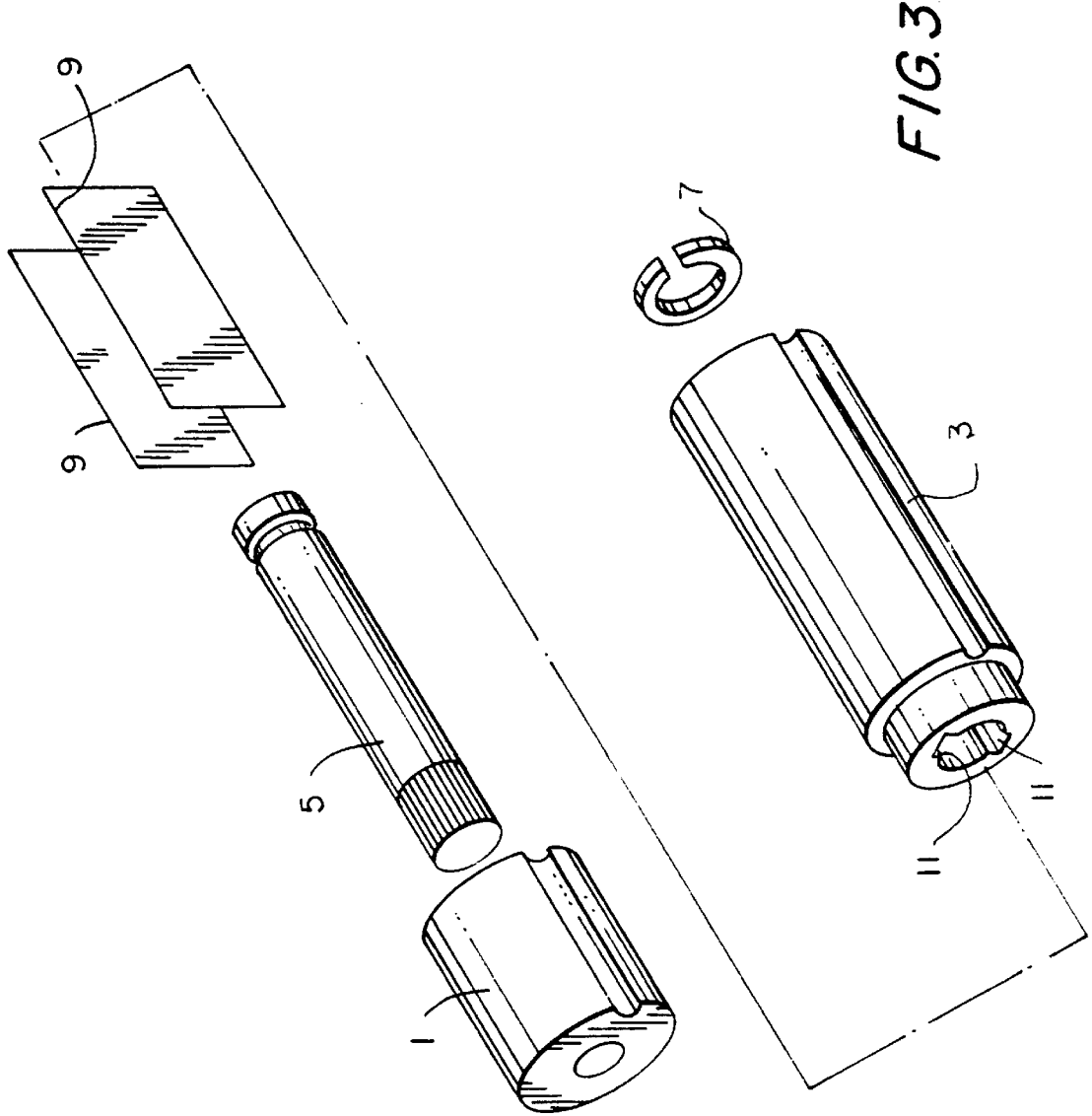
FIG. 3 is an exploded, projection view of the hinge showing the base, housing, shaft, and plates.

The general configuration and construction of our inventive hinge can be understood by reference to FIGS. 1, 2 and 3. In FIG. 1, the preferred embodiment of the assembled hinge is shown, having a generally cylindrical exterior shape. Base 1 and housing 3 are shown with the aforementioned axial groove so that each segment can be irrotationally mounted within one piece of the host device. Other exterior shapes would work as well, for instance, the housing and base could be formed with a square cross-sectional shape to prevent rotation within the mounting holes.

FIG. 2 shows a method for piloting base 1 and housing 3 to ensure that they rotate coaxially. Shaft 5 is knurled and press fitted into an axial hole in base 1. The other end of shaft 5 has a lock-ring groove. Lock ring 7 holds the assembly together.

Figure 4:
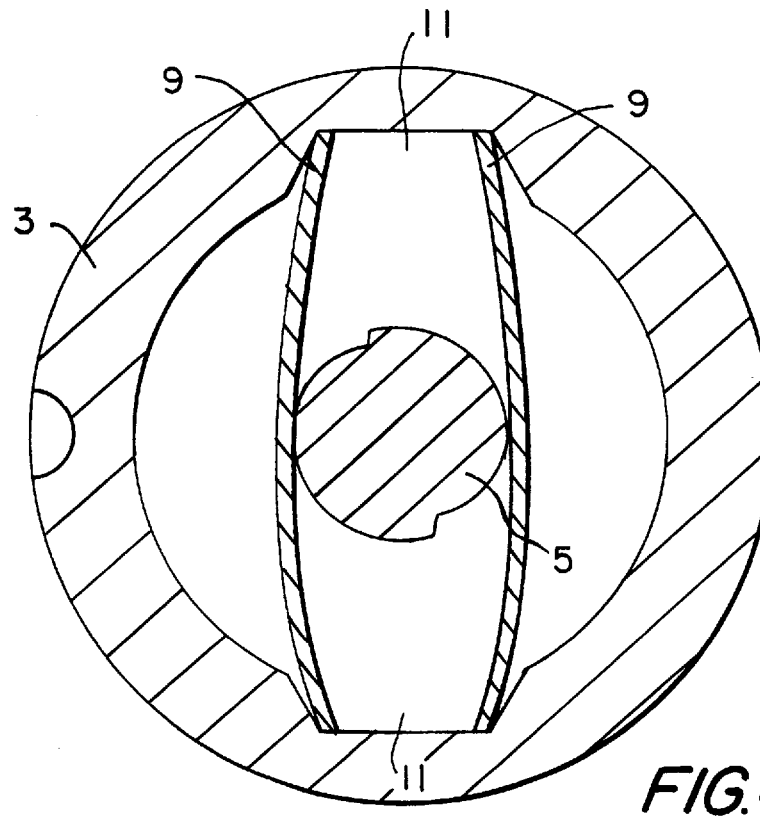
FIG. 4 is a cross-sectional view of the assembly taken through the housing and perpendicular to the axis of the hinge.

In FIG. 3, plates 9, of which two sets can be seen, extend at an angle with respect to the axis of rotation of housing 3 and have ends which fit into grooves or indentations 11 on the interior surface of housing 3 with one set of plates on each side of shaft 5 as can be seen also in FIG. 4. Plates 9 are made of spring material. Each side can have a single plate, or a stack of several plates. The choice depends upon the stress levels that will occur as the shaft rotates. Plates 9, grooves 11, and shaft 5 are sized so that the plates are forced against the shaft when it is inserted into the assembly. The amount of force is dictated by the design requirements. If shaft 5 has a circular cross-sectional shape, then there will be uniform frictional drag as shaft 5 is rotated between plates 9.

The shaft of FIG. 4 has a symmetric, but non-circular, cross-sectional shape. As shaft 5 is rotated with respect to housing 3 and plates 9, the deflection of plates 9 will vary, as will the torque required, according to the shape of shaft 5. By varying the shape of the shaft, the torque required can be configured to meet a wide range of requirements.

Figure 5:
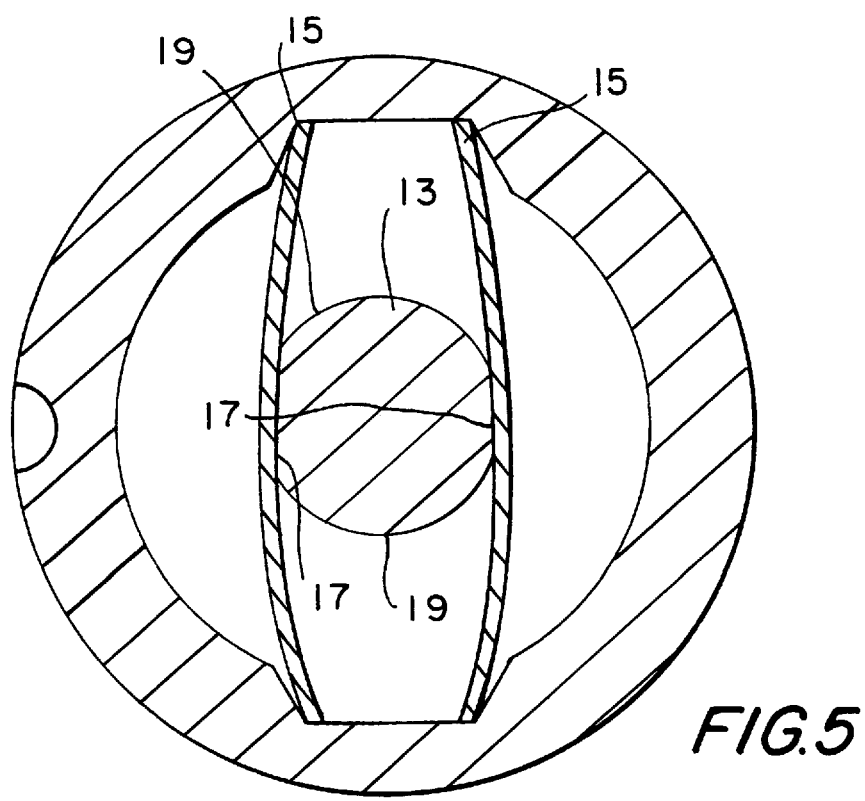
FIG. 5 is a cross-sectional view of an embodiment with detenting characteristics.
Figure 6:
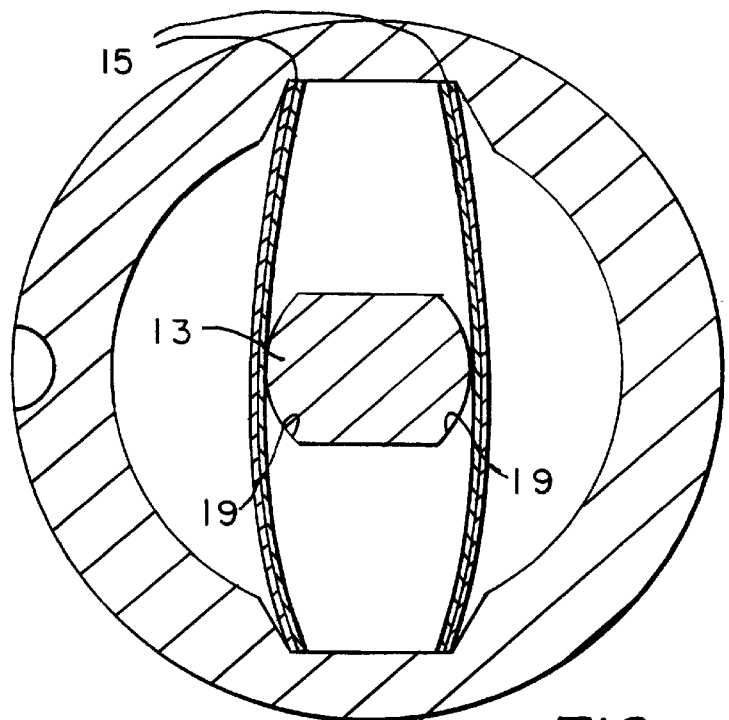
FIG. 6 is the same view as FIG. 5 but with the shaft rotated out of the detenting position.

It is a significant advantage of our invention that the frictional forces are symmetric about the axis of the hinge so that there are substantially no net side loads between shaft 5 and housing 3 where shaft 5 exits the housing, or in the rotary joint between base 1 and housing 3. This is particularly important in the embodiment shown in FIG. 5 whose construction is similar to the previous embodiment except that shaft 13 is generally round with two distinct flats 17, symmetrically disposed about the axis of the shaft. As shaft 13 is rotated from the position shown in FIG. 5 to the position shown in FIG. 6, plates 15 are bent, producing a restoring torque that tends to return shaft 13 to its starting position. When the curved portions 19 of shaft 13 come into contact with plates 15, the restoring torque disappears, leaving only frictional torque that resists rotation in either direction. As will be understood from the forgoing description, the configuration of FIG. 5 of the invention provides a rotary joint hinge with two detent positions. Clearly, if the shaft were square, the hinge would have four detent positions.

Figure 7:
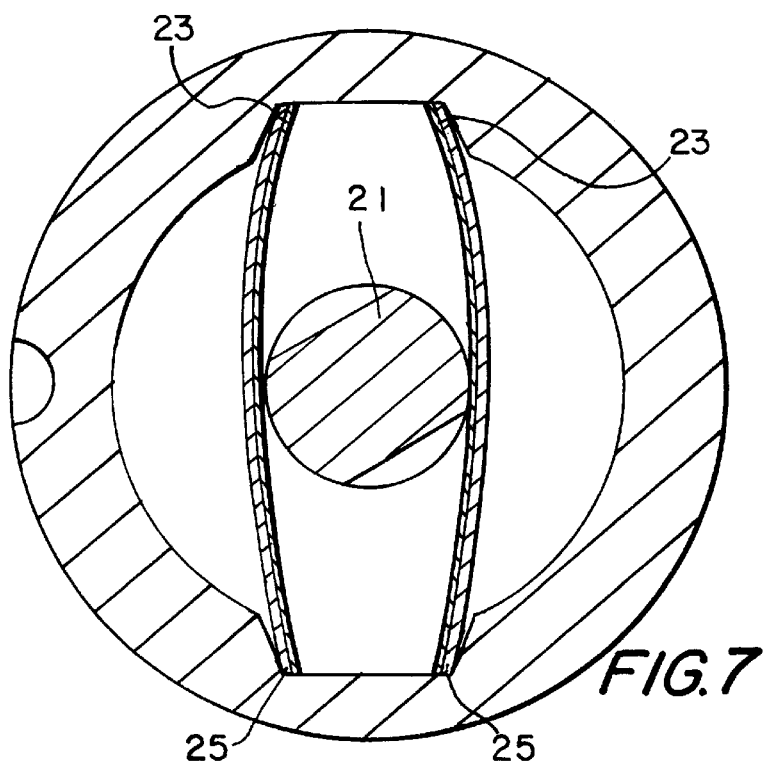
FIG. 7 is a cross-sectional view of a similar embodiment having thin wear plates.

For smaller external diameters the forces required to produce any given torque become larger. Under highly loaded conditions, shaft configurations, such as the one used in FIGS. 5 and 6 with edges having small curvature radii, can produce large surface stresses in the plates. Since the maximum bending can occur when the localized surface stress is also at a maximum, stress failure imposes a limitation on the achievable torque. This condition can be alleviated somewhat by increasing the radius of curvature at the corners of the shaft. FIG. 7 depicts a hinge similar to the one shown in FIGS. 5 and 6, but with shaft 21 rotated so that the corners are impinging on the plates. In the hinge of FIG. 7 each of the two sets of plates is made up of one thinner plate 23 on the inside to contact shaft 21, and one thicker plate 25 outside of thinner plates 23. Being thinner, the surface material of inner plates 23 is under less bending stress than would be the case if the plates were thicker. Since stress failure is dependent on the total stress, reducing the bending stress eases the effect of the surface stress imposed by contact with the shaft. The thicker outer plates 25 incur less of the surface stress, and can, therefore, endure larger bending stresses.

Figure 8:
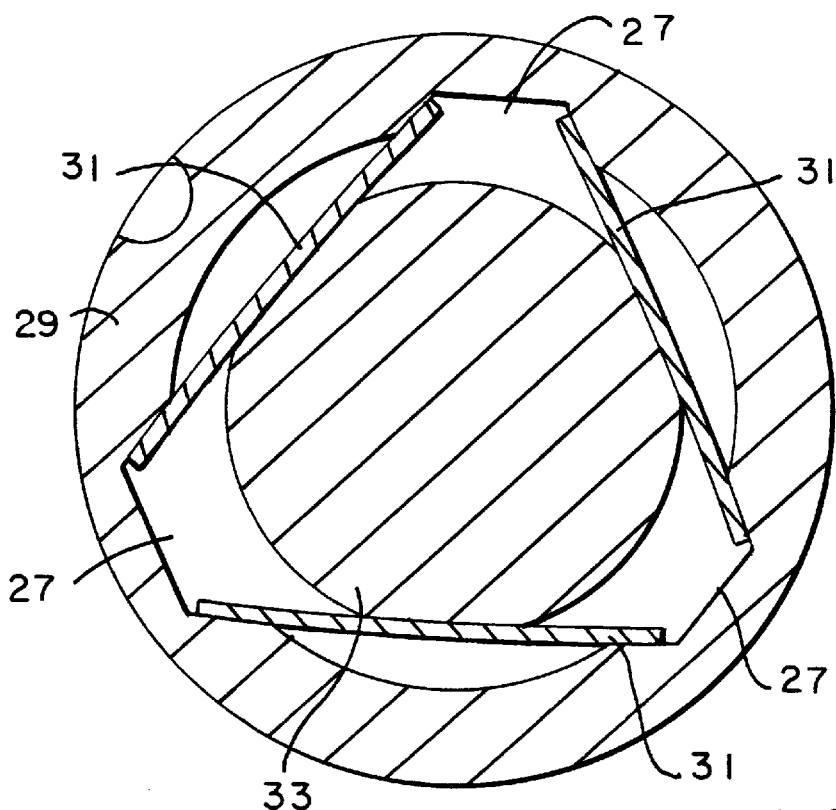
FIG. 8 is a cross-sectional view of another embodiment of our invention.

FIG. 8 depicts another embodiment of our invention having a triangular configuration of grooves, plates, and shaft features. Three grooves 27 in housing 29 contain three plates 31 which surround shaft 33. In the embodiment shown, shaft 33 has three flats that correspond to the three sets of plates. This arrangement provides for detent positions that are 120 degrees apart. As before, if the shaft were round in cross-section, this device would provide pure frictional torque. Clearly, many other shaft configurations can be used to provide many combinations of frictional torque and detenting. The configurations that have been revealed thus far have all symmetric with respect to the axis of the shaft. However, many asymmetric configurations are also possible. While asymmetric shaft configurations do produce side loads which are undesirable, some applications may be able to tolerate some amount of side load in order to gain the benefit of a particular asymmetric configuration.

Figure 9:
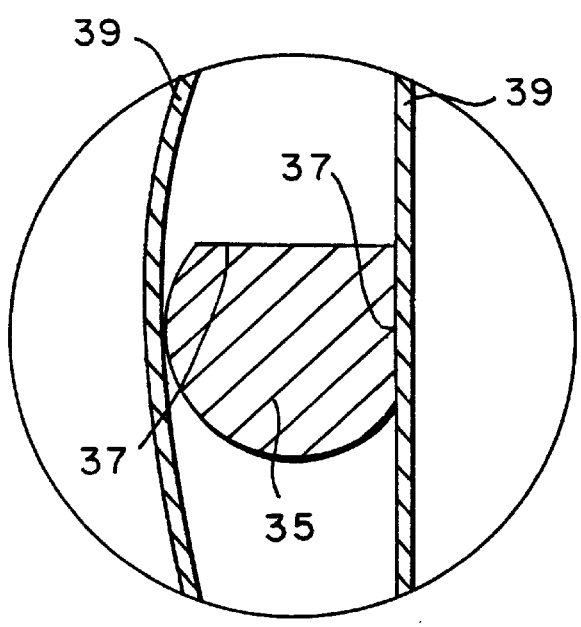
FIG. 9 is a cross-sectional view of yet another embodiment of our invention; and, FIG. 10 is a cross-sectional view of still another embodiment of our invention.

FIG. 9 depicts another asymmetric shaft configuration. Shaft 35 has flats 37 at arbitrary angles with respect to one another so that they contact one of plates 39, producing a detenting force while frictional torque is provided by contact with the other plate.

Figure 10:
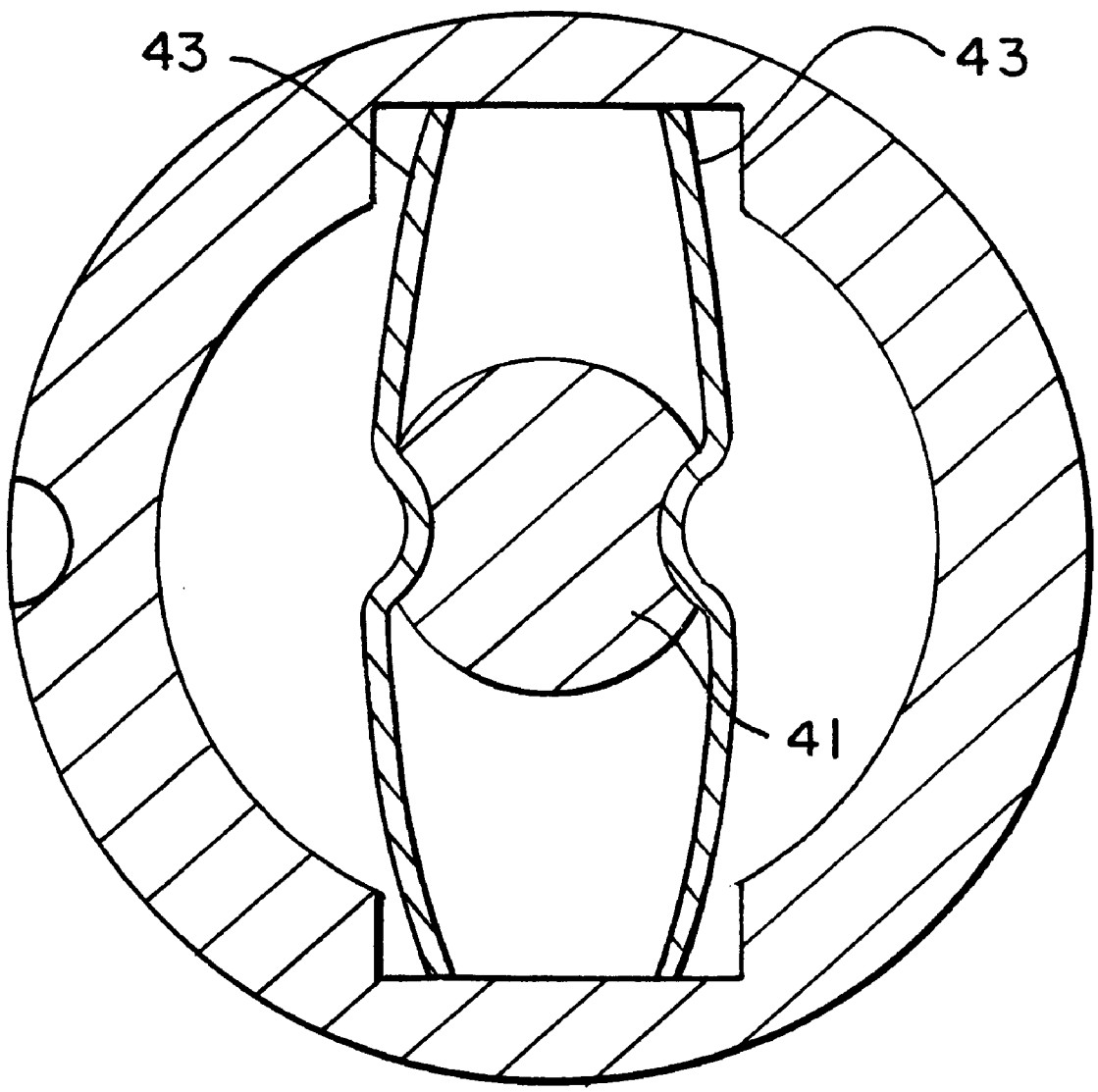

FIG. 10 depicts another variation of the invention in which shaft 41 is configured with arcuate features that match features in bands 43. This configuration provides strong detenting in the position shown in FIG. 10, and frictional torque once the shaft is rotated far enough so that the detenting features of the bands are contacting the outside diameter of the shaft.

All of the embodiments of the invention will benefit from the use of multiple plates to limit the bending stresses in each plate. Also, the use of a thin plate as the inner plate in each stack has the beneficial effect of reducing the total stress in that plate. This occurs because the total stress in the sum of the bending and the Hertz, or surface stress. Since these inner plates must bear the surface stress of contact with the shaft, it is better to reduce their bending stress as much as possible by making these plates thin.

We claim:

1. A hinge assembly comprising:

a shaft rotatable with respect to a housing along an axis;

said shaft running through an axially formed passage of said housing, said passage being formed with indentations; and a plurality of spring plates disposed within the housing passage and symmetrically placed about the shaft, said spring plates extending at an angle with respect to said axis, each spring plate having two opposed ends supported within said passage by said indentations, said plates frictionally engaging said shaft during rotation of the shaft such that there are no net side loads between the shaft and the housing.

2. The hinge assembly of claim 1, further including a base with an axially formed hole in which one end of said shaft is engaged therewithin.

3. The assembly of claim 1, wherein each of said shaft and said housing is substantially cylindrical in shape.

4. The assembly of claim 2, wherein said shaft one end is knurled for being press-fit into said base hole.

5. The assembly of claim 1, wherein said shaft has an end formed with a groove for selectively receiving a locking ring in order to hold together said shaft and said housing.

6. The assembly of claim 1, wherein said housing passage defines an inside surface formed with one groove in which said a plurality of spring plates is fitted.

7. The assembly of claim 1, wherein said shaft has a substantially circular cross-sectional shape in order for a substantially uniform frictional drag to be produced by said plurality of spring plates on said shaft as said shaft is rotated.

8. The assembly of claim 1, wherein said shaft has a non-circular cross-sectional shape such that at least one of said spring plates produces a variable frictional drag on said shaft as said shaft is rotated.

9. The assembly of claim 1, wherein said shaft includes at least one flat segment formed therealong.

10. The assembly of claim 9, wherein said at least one flat segment comprises a plurality of flats symmetrically disposed along said shaft.

11. The assembly of claim 1, wherein said plurality of spring plates comprises a first pair of plates disposed on one side of said shaft, and a second pair of plates disposed on the opposite side of said shaft.

12. The assembly of claim 11, wherein each of said pairs of plates comprises one inside thinner plate for contacting said shaft and one outside thicker plate.

13. The assembly of claim 6, wherein said inside surface defined by said passage includes a plurality of grooves selectively placed for receiving said plurality of spring plates in said passage.

14. The assembly of claim 13, wherein said shaft is formed with a plurality of corresponding flats therealong for selectively engaging with said plurality of spring plates.

15. The assembly of claim 9, wherein said at least one flat segment comprises a plurality of flats formed along said shaft at arbitrary angles with respect to one another.

16. The assembly of claim 1, wherein said shaft is formed with a plurality of arcuate troughs.

17. The assembly of claim 16, wherein said plurality of spring plates comprises a plurality of spring bands each having an arcuate segment therealong for selectively mating with said plurality of arcuate troughs of said shaft.

* * * * *